(12) United States Patent
Beshai

(10) Patent No.: US 6,700,896 B1
(45) Date of Patent: Mar. 2, 2004

(54) HIGH-CAPACITY WDM DATA NETWORK

(75) Inventor: Maged E. Beshai, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/516,938

(22) Filed: Mar. 1, 2000

(51) Int. Cl.[7] .............................................. H04J 14/02
(52) U.S. Cl. ...................................... 370/427; 370/542
(58) Field of Search ................................ 370/380, 381, 370/386, 366, 367, 427, 536, 542

(56) References Cited

U.S. PATENT DOCUMENTS

| | | | | |
|---|---|---|---|---|
| 4,173,713 A | * | 11/1979 | Giesken et al. | 370/374 |
| 4,821,034 A | * | 4/1989 | Anderson et al. | 340/2.22 |
| 5,604,617 A | * | 2/1997 | Burton | 359/117 |
| 5,815,489 A | * | 9/1998 | Takatori et al. | 370/217 |
| 5,841,556 A | * | 11/1998 | Hong et al. | 359/117 |

* cited by examiner

Primary Examiner—Melvin Marcelo

(74) Attorney, Agent, or Firm—Max R. Wood; Ogilvy Renault

(57) ABSTRACT

A high-speed wavelength-division multiplexed (WDM) network that provides compliant, "invisible" paths of adaptive capacity from an external information source to an external information sink is described. The WDM network includes a plurality of high-speed electronic edge switch modules that are connected by WDM optical links to parallel-plane switch core modules. Smearing distributors ensure that packets to be transferred to a given output link are distributed evenly among the planes of the core modules. Consequently, contention is resolved. Each edge switch is connected to each core module by a WDM optical link. For purposes of admission control, the capacity of the link, rather than the capacity of channels in the link, is considered. This provides much improved granularity in connection bandwidth. The smallest connection may be a few kb/s, while the largest connection may be link capacity. Each edge switch is also adapted to accept data from external sources in a plurality of formats. Data is transferred through the network as fixed-length data segments and the network is content unaware beyond the edges. The advantages include a highly scalable, high-speed compliant network that is invisible to a user because connection is simple, source/sink protocols are generally not an issue, and delay jitter is minimal.

8 Claims, 6 Drawing Sheets

HIGH-CAPACITY WDM DATA NETWORK

STATEMENT REGARDING FEDERALLY SPONSORED RESEARCH OR DEVELOPMENT

This work was supported by the United States Government under Technology Investment Agreement TIA F30602-98-2-0194.

TECHNICAL FIELD

This invention relates generally to the field of high speed data networks and, in particular, to a smearing distributor for a high speed data network that enables the network to provide paths of adaptive capacity from an external information source to an external information sink.

BACKGROUND OF THE INVENTION

The explosive growth of the Internet and a corresponding increase in the computing capacity of computers for accessing the Internet have created a strong impetus for designing networks that can provide the capacity required to support new service opportunities. The current structure of the Internet is a complicated interconnection of intricate nodes that require complex protocols for data transfer. The configuration, installation and maintenance of the equipment and the operation of the Internet requires a large work force having knowledge and extensive experience.

There is a growing acceptance of the proposition that in order to realize its potential, at least the backbone of the Internet must be simplified to enable scalability and improve throughput to provide bandwidth to support innovative application development at the network edges.

Applicant has long realized and advocated the advantages of simplifying network structures and network protocols to enable a high capacity network capable of serving as a backbone for the next generation Internet. Steps toward providing a simplified network structure and protocol include inventions described in the following United States Patent Applications to the Applicant:

U.S. patent application Ser. No. 09/132,465 which was filed on Aug. 11, 1988 and entitled UNIVERSAL TRANSFER METHOD AND NETWORK WITH DISTRIBUTED SWITCH, the specification of which is incorporated herein by reference;

U.S. patent application Ser. No. 09/244,824 which was filed on Feb. 4, 1999 and entitled RATE CONTROLLED MULTI-CLASS HIGH-CAPACITY PACKET SWITCH, the specification of which is also incorporated herein by reference; and U.S. patent application Ser. No. 09/286,431 which was filed on Apr. 6, 1999 and entitled SELF-CONFIGURING DISTRIBUTED SWITCH, the specification of which is likewise incorporated herein by reference.

It is well understood in the art that decisions respecting the architecture of data networks have a lasting impact on network economics, operations and performance. Wavelength-division multiplex (WDM) optical links have become a popular medium for data transfer. In a WDM optical link, light of two or more wavelengths is used for the simultaneous transfer of binary data streams. WDM optical links are typically used as a collection of individual data channels, each wavelength representing a single data channel. This affects both traffic efficiency and network scalability. The combined data traffic capacity of the channels of a W-channel WDM link is less than that of a W-channel shared link. The scalability of WDM networks depends largely on the network architecture and mode of operation. If channel-switching is used in the core of switches in the network, the data traffic capacity of the network is limited by the speed at which the channels can be switched and the rate at which network switches can be reconfigured. If packet switching is used in the core of switches in the network, the network capacity is determined by the rate at which packets can be switched in the core. There is a disadvantage of using WDM optical links as a collection of individual data channels, because that limits the maximum bandwidth that can be assigned to a connection to the bandwidth capacity of a single data channel. Consequently, there exists a need for a network architecture that enables more flexible connection granularity.

It is well known that routing protocols used in the Internet are complex. A problem that arises due to the complexity of Internet routing protocols is the knowledge required to operate the network. A very large work force is employed to set up and maintain links to the Internet because of the complexity and limitations of the protocols used to transfer data. Significant efficiencies could be realized if the backbone of the Internet were substantially passive in such a way that it were substantially "invisible" to users. An "invisible" network is a network that accepts connections from a plurality of edge protocols without requiring complex interfaces to perform protocol conversions, and delivers data to a data sink in a format in which the data was received from a data source.

There therefore exists a need for a network which provides compliant, invisible paths for a number of different data transfer protocols.

SUMMARY OF THE INVENTION

It is therefore an object of the invention to provide a WDM data network that includes smearing distributors to enable higher connection bandwidth.

It is a further object of the invention to provide a WDM data network that includes smearing distributors to enable compliant, invisible paths for a wide range of data transfer protocols.

The invention therefore provides a smearing distributor for a wavelength-division multiplexed (WDM) data network. The smearing distributor includes a demultiplexer for demultiplexing the channels of an incoming WDM communications link having W channels, W smearing units, and a passive W×W rotator having a plurality of input ports and a plurality of output ports. Each input port of the passive rotator is adapted to connect to a smearing unit which is connected to a channel of the communications link, and each output port of the passive rotator is adapted to connect to a respective input port of a plane of a parallel-plane switch.

Each smearing unit sorts the data segments it receives into N queues, N being the number of outgoing WDM links connected to the parallel-plane switch, and transfers each data segment to an output port so that data segments from any one of the N queues are transferred to the output ports in a substantially even distribution.

There is a smearing distributor associated with each communications link in the WDM network. The number of input ports on the smearing distributor equals the number of channels in a WDM communications link.

Each smearing unit tracks the plane of the parallel-plane core module to which a last data segment was transferred. This is done to ensure that data segments to be routed to an outgoing WDM link are transferred to sequential planes of the parallel-plane core module. Consequently, the data segments routed to a given outgoing WDM link are transferred in an order in which a data segment is only transferred to a plane adjacent the plane to which a last data segment routed to the same outgoing WDM link was transferred.

The invention further provides a wavelength-division multiplexed data network comprising a plurality of rate-regulated ingress edge modules, each of the edge modules having a plurality of ingress ports and a plurality of output ports. The ingress ports are connected by communications links to data packet sources. A plurality of smearing distributors having a plurality of input ports and a plurality of output ports are located between the edge modules and core modules. Each of the smearing distributors is respectively connected by a communications link to a respective one of the edge modules. Each communications link consists of a plurality of communications channels respectively providing a connection between an output port of the edge module and an input port of the smearing distributor. The core modules comprise parallel-plane switches, each plane of the parallel-plane switches having a plurality of input ports and a plurality of output ports, each input port being connected to a corresponding output port of one of the smearing distributors. The smearing distributors are adapted to ensure that consecutive data packets destined for the same output link are distributed substantially equally among the planes of the parallel-plane switch.

Preferably, the communications links used to interconnect the edge modules and the core modules are wavelength-division multiplexed (WDM) optical links that support a plurality of channels. The smearing distributor has one input port and one output port for each of the channels in the communications links. The number of planes in the single-stage space switch preferably equals the number of ports of each smearing distributor.

In one embodiment, each output port of each plane of the parallel-plane switch is connected directly to an input port of an egress edge module by a connumications channel, the egress edge module having a plurality of egress ports connected to data packet sinks.

As an alternative, in a second embodiment, the core modules may also be interconnected to permit more flexible routing and increase scalability. If the core modules are interconnected, a smearing distributor is located on each link between an output side of the first core module and an input side of the second core module. Carefully constructed routing plans minimize the number of hops required to establish a connection. Thus, the network may include a second core stage including a second plurality of smearing distributors connected by a plurality of communications links to the output ports of the planes of a parallel-plane switch, and a second parallel-plane switch, each plane of the parallel-plane switch being connected by a communications channel to a corresponding output port of one of the second plurality of smearing distributors. In this configuration, an output port of each plane of the second parallel-plane switch is connected by a communications link to an input port of an egress edge module.

Successive pluralities of smearing distributors followed by parallel-plane switches can be configured. However, a large number of stages is neither necessary nor desirable.

The high-speed WDM data network in accordance with the invention provides a number of advantages. For example, the capacity is scalable from a few Terabits per second (Tb/s) to several Exabits per second (Eb/s), while the per-connection bandwidth allocation can range from a few Kb/s to about one Tb/s. The scalability of the WDM network permits the number of edge modules to be scaled to several millions. The number of data flows from (to) an edge module can also be varied from a few, to millions of simultaneous connections.

The efficient use of each WDM link as a single medium, while still providing connectivity with fine granularity and virtually eliminating data blocking in a potentially large modular core enables the WDM network in accordance with the invention to be scaled to meet the foreseeable requirements of the next generation Internet.

BRIEF DESCRIPTION OF THE DRAWINGS

The invention will now be explained by way of example only, and with reference to the appended drawings, in which.

It should be noted that throughout the appended drawings, like features are identified by like reference numerals.

DETAILED DESCRIPTION OF THE PREFERRED EMBODIMENT

This invention relates to a smearing distributor for a high speed Wave Division Multiplexed (WDM) data network that provides paths of adaptive capacity from an external information source to an external information sink. The network includes a plurality of electronic ingress edge modules adapted to connect to data sources and egress edge modules adapted to connect to data sinks to provide compliant, invisible paths for various predetermined data transfer protocols. The electronic ingress edge modules are connected by WDM optical links to one or more core modules.

Figure 1:
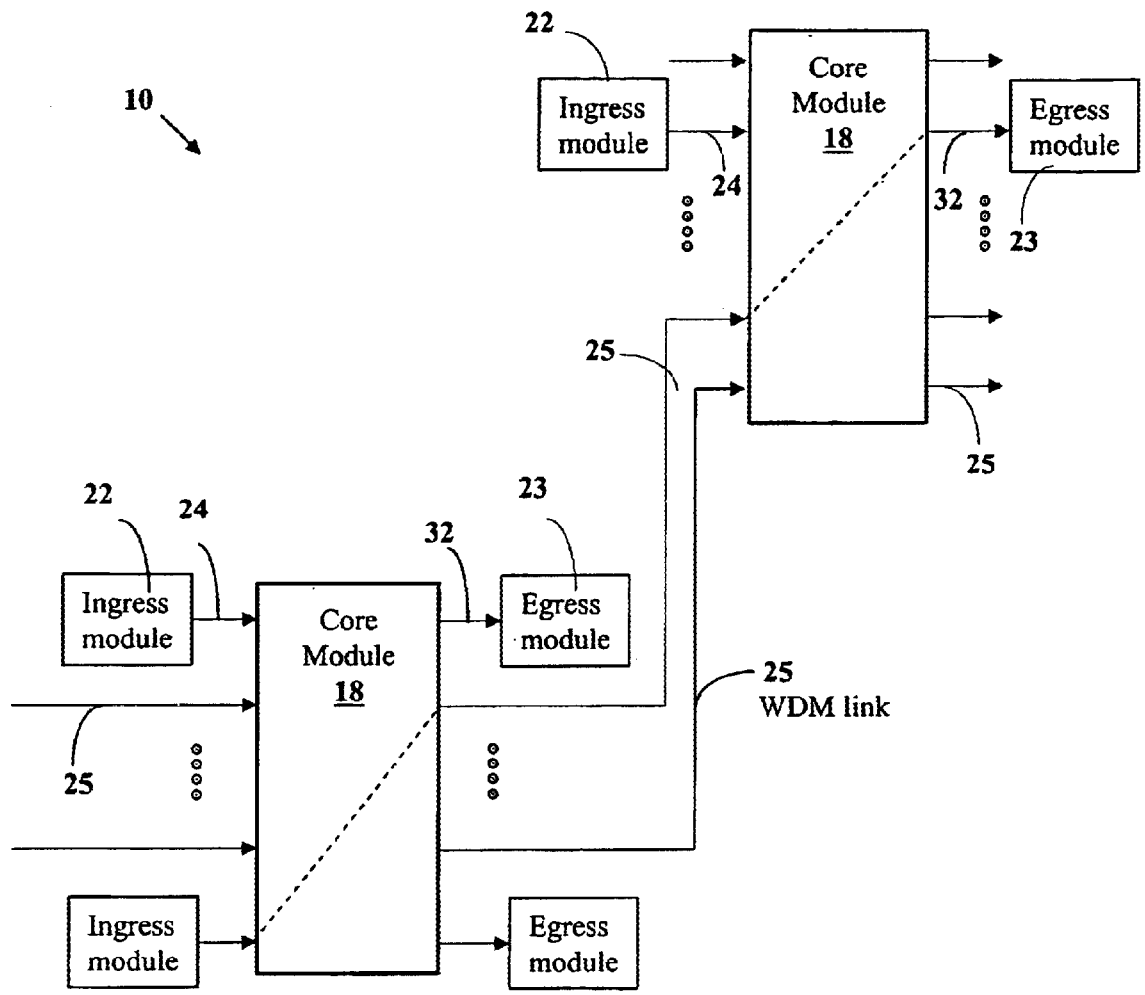
FIG. 1 is a schematic diagram showing a sector of a network of edge modules and core modules.

FIG. 1 shows two core modules 18 of a data network 10 having a plurality of core modules. Each core module receives data from any of a plurality of ingress edge modules 22 through a WDM link 24 or from any of a plurality of inter-core-module WDM links 25. Each core module transfers the data it receives to any of egress edge modules 23 through a WDM link 32 or to any inter-module WDM link 25. The interconnection of the ingress or egress edge modules to the core modules, and the interconnection of core modules is made using entire WDM links.

Each ingress edge module 22 comprises a rate-regulated data packet switch adapted to transfer data units of a predetermined length to the core modules 18. Each egress edge module 23 is adapted to receive the data segments and reassemble data packets for delivery to data sinks. The ingress edge modules 22 and the egress edge modules 23 are typically paired, and each pair shares a common data memory (not shown). The ingress edge modules 22 have ingress ports that are connected to subtending traffic sources and output ports that are connected to a core module 18 of the data network 10. The egress edge modules 23 have input ports that receive data from output ports of a core module 18 and egress ports that transfer data to subtending traffic sinks (not shown).

In the data network 10, each core module 18 is a high-capacity (W×N)×(W×N) fully-connected switch, N being the number of incoming links and the number of outgoing links, and W being the number of channels (wavelengths) per link. In order to reduce the number of hops in a very large network, the number of links supported by each core module 18 must be relatively large. The capacity of a core module 18 is N×W×R, R bits per second being the capacity of each channel. With N=512, W=64, and R=10 Gb/s, the required capacity of a core module is 327.68 Terabits per second. It is well understood that with current technology it is not practical to scale a fully-connected core module to that size.

Figure 2:
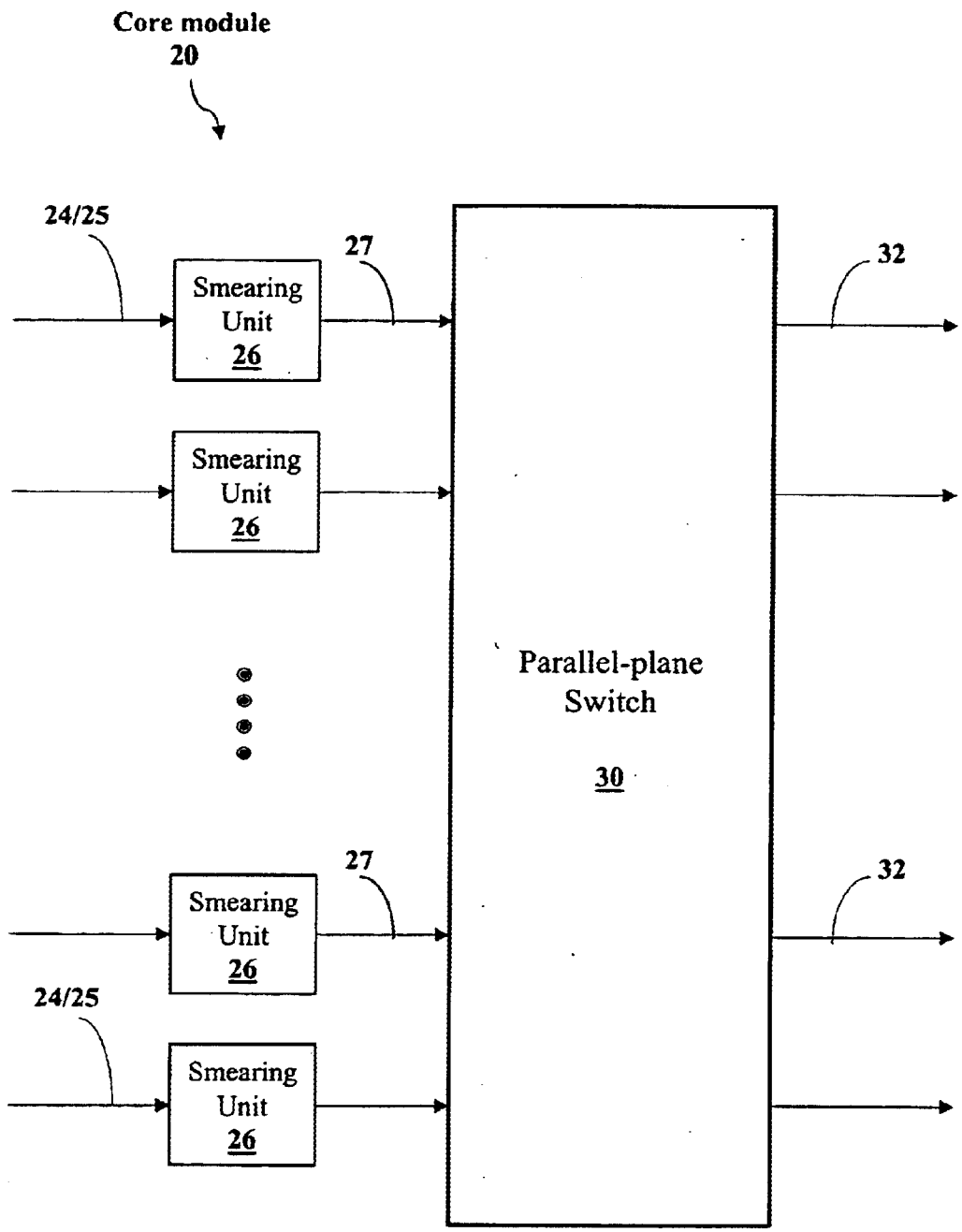
FIG. 2 is a schematic diagram of a core module and associated smearing distributors in accordance with the invention.

A much simpler parallel-switch construction for the core modules 18 is based on W independent switches, each having a capacity of only about 5 Terabits per second. However, blocking in a core module construction of this type can be excessively high if the individual channels of each WDM link carry loads that are unevenly distributed. To alleviate the blocking problem, a parallel-plane switch 30 (FIG. 2) is preceded by a "smearing distributor" 26, as will be described below in detail. In accordance with one embodiment of the invention, each core module 20 shown in FIG. 2, includes N smearing distributors 26 associated with each parallel-plane switch 30. The parallel-plane switch 30 includes W parallel N×N switches. This configuration replaces the prior art fully-connected (W×N)×(W×N) core module 18 shown in FIG. 1.

Thus, in accordance with the invention, each core module 20 has a parallel-plane switch 30 that includes a plurality of switches 28 (FIG. 3) that switch data segments between the edge modules 22, 23. The switches 28 are preferably single-stage space switches, well known in the art. The core modules 20 are substantially passive. Network control is significantly simplified by positioning the smearing distributors 26 between the edge modules 22, 23 and the parallel-plane switch 30. The smearing distributors 26 ensure that consecutive data segments destined for any WDM link outgoing from the core module 20 are distributed substantially equally among the respective planes of the parallel-plane switch 30. The smearing distributors 26 are preferably collocated with the parallel-plane switch 30, as this arrangement reduces the number of optical-to-electrical conversions required as data transverses the network 10.

The ingress edge modules 22 are preferably connected to the smearing distributors 26 by a WDM optical link. A smearing distributor is required for each WDM optical link interconnecting an ingress edge module with a core module 20. An ingress edge module 22 may have several WDM links respectively connected to different core modules 20. The smearing distributors 26 are also required for links that connect one core module 20 to another core module 20, as will be described below in more detail with reference to FIG. 7.

The network 10 enables much improved granularity of the size of communications connections. Data traffic admission control is based on the entire capacity of a link, not the capacity of a channel in the link. Consequently, while the lowest bit rate that may be allocated to a connection may be as small as a few Kb/s, the maximum connection bit rate is the entire capacity of the WDM link, for example 640 Gb/s.

As noted above, data from ingress edge modules 22 is transferred in data segments of equal length; 4 kilobits for example. Variable-length packets for the same destination are mapped into the fixed-length data segments in a continuous stream without creating unused fractions of the respective data segments. A packet of an arbitrary length may be transferred in more than one data segment, and a data segment may contain data belonging to more than one packet. For example, if three consecutive packets of lengths 6, 5, and 9 kilobits are transferred in a continuous stream, in data segments of 4 kilobits each, five data segments would be used to transfer the 20 kilobits (6+5+9=20). The second data segment would contain data from the first two packets, and the third data segment would contain data from the second and third packets. The third packet occupies a small portion of the third data segment and fully occupies the fourth and fifth data segments.

Figure 3:
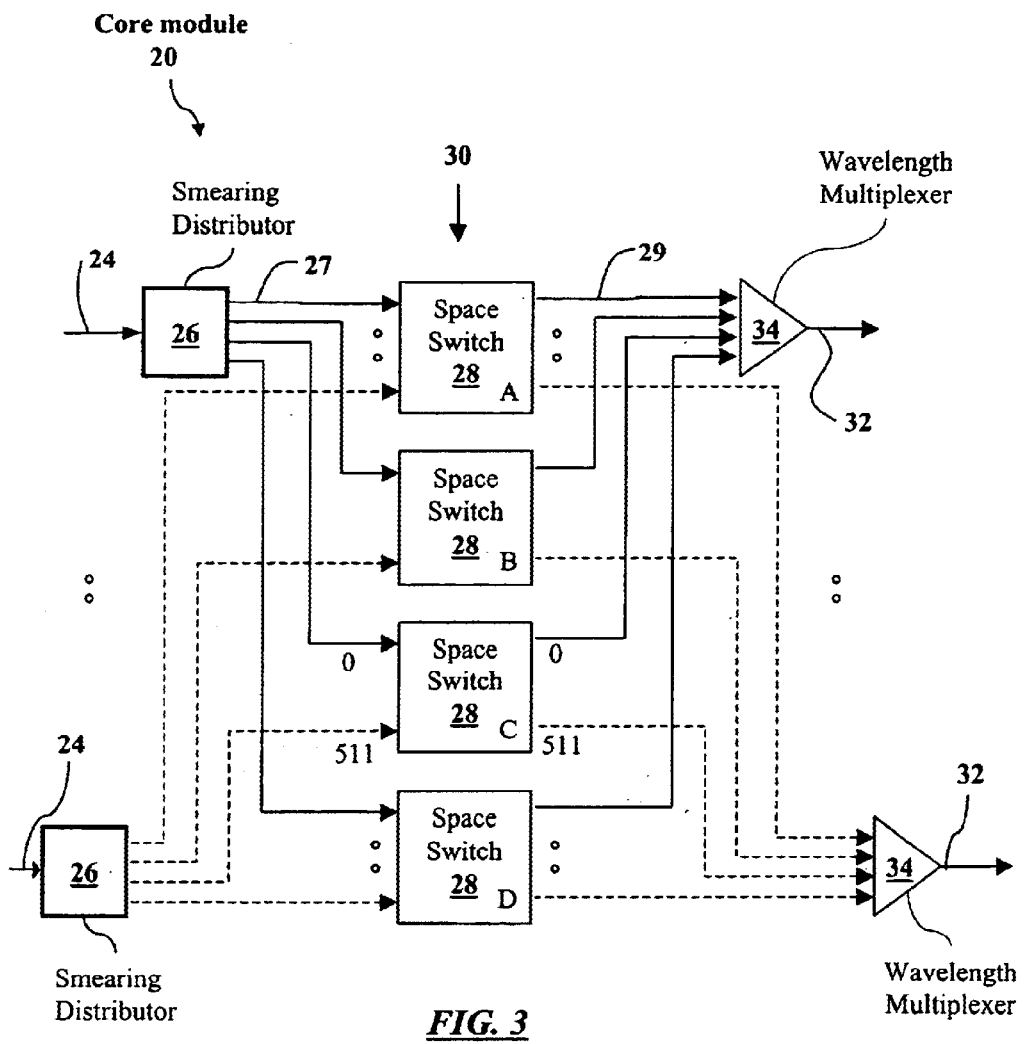
FIG. 3 is a schematic diagram of an exemplary parallel-plane core module and associated smearing distributors in accordance with the invention.

FIG. 3 is schematic diagram of a configuration of a high capacity core module 20 in accordance with the invention. The high capacity core module 20 is connected to a plurality of ingress edge modules 22 (not shown), 512 ingress edge modules, for example. Each ingress edge module 22 supports at least one WDM optical link 24 which links the edge module to a smearing distributor 26. A preferred configuration of the smearing distributor 26 is described with reference to FIG. 4. The smearing distributor 26 demultiplexes the WDM optical link 24 and each demultiplexed channel of the WDM link 24 is connected to an input port of one plane 28 of a parallel-plane switch 30. Each plane 28 of the parallel-plane switch 30 is preferably a space switch, such as a rotator-based space switch described in Applicant's co-pending U.S. patent application Ser. No. 09/244,824 referenced above. Each plane 28 of the parallel-plane switch 30 preferably has a large number, N, of input ports and an equal number of output ports, each having a capacity, R, for example of an order of 10 Gb/s. Each plane 28 therefore connects to N edge modules (typically 512). Each plane 28 is preferably a rotator-based switch that readily scales to about 5 Tb/s. If the number of channels (W) in each WDM optical link is 64 and each plane has 512 input and 512 output ports, each port having a capacity of 10 Gb/s, the total capacity of the core module 20 is about 320 Tb/s.

Each plane 28 of the parallel-plane switch 30 is connected by links 29 to a wavelength multiplexer 34 that recombines the wavelengths for transfer over WDM optical links 32. Optical links 32 are either connected directly to egress modules 23 or to other core modules 20, as will be explained below with reference to FIG. 7.

Figure 4:
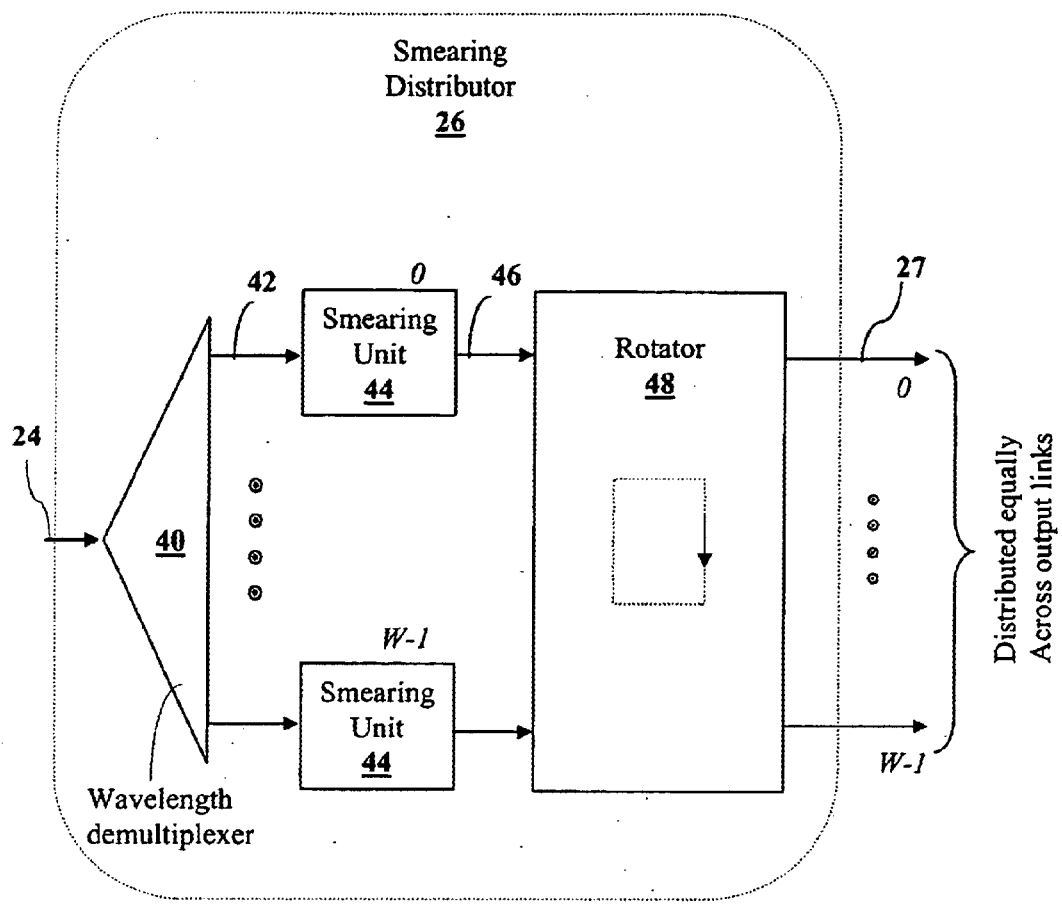
FIG. 4 is a schematic diagram of a preferred embodiment of a channel-to-link smearing unit in accordance with the invention.

FIG. 4 shows one embodiment of a smearing distributor 26 in accordance with the invention. The smearing distributor 26 includes a demultiplexer 40 that demultiplexes the W wavelengths of the signal received from optical link 24 and converts the optical signals to electrical signals that are output over connections 42 to a channel-to-link smearing unit 44. There is one channel-to-link smearing unit 44 for each of the W wavelengths. Each channel-to-link smearing unit 44 is connected by a channel 46 to a passive rotator 48 having W input ports and W output ports. A plurality of connectors 27 connect the output ports of the passive rotator 48 to corresponding input ports of the planes 28 of the parallel-plane switch 30 (FIG. 3). The distribution of data units, referred to as the "smearing" of data units, will now be explained.

Smearing Distributors

Data is transferred in data segments to the high-capacity core module 20, as described above. Each data segment preferably has a predetermined length (4 kilobits, for example). A data segment may include several packets, or only a portion of a packet. The assembly of data segments is handled by the ingress edge modules 22. The disassembly of data segments and the re-assembly of data packets is handled in the egress edge modules 23. The time required to transfer one data segment is hereinafter referred to as a "time slot".

During each time slot, a channel C of an input link 24 (FIG. 3) may have a data segment waiting to be forwarded to one of N WDM optical output links 32. A succession of data segments from channel C may require forwarding to a given output link 32, identified as link L, $0 \leq L < N$. Link L has W channels, each of which is connected to the $L^{th}$ output port of each of the W planes in the parallel-plane switch 30. If channel C distributes its data segments destined to link L in such a way that the data segments are switched in consecutive planes 28 (FIG. 3), the need to coordinate the transfer of data segments from all channels of all input links 24 is eliminated. Preferably, the data segments are transferred to the consecutive planes 28 without gaps, regardless of their arrival-time pattern at the core module 20. If this discipline is applied consistently to the data segments of each channel of each ingress link 24, scheduling and coordination of the transfer of data segments becomes redundant and unnecessary. The process of switching of the data segments from an input channel 24 to the output links 32 through consecutive planes 28 of the parallel-plane switch 30 is hereafter referred to as "channel-to-link smearing". An example of the channel-to-link smearing process is described below.

Without the smearing processes, blocking could occur in the single-stage parallel-plane core module due to generally-unequal distribution of the data segments directed to the individual channels of an outgoing WDM link.

Delay-jitter

When a data segment is transferred to an input port of a switching plane 28, it may have to be placed in an input queue (not shown). Queuing is required because a channel from another incoming link may have a segment to transfer to the same output link at the same time. This results in delay jitter. The delay jitter is, however, bounded by the smearing process, and a short re-assembly buffer at the egress module 23 reassembles the data segments of the same data stream in the order in which the data stream was received at the ingress module 22.

Channel-to-Link Smearing

The following notation is used in the description of the smearing processes:

N: number of outgoing WDM links per core module—N is preferably 256 to 512.

W: number of planes in the parallel-plane switch (parallel switching planes) of each core module; also the number of wavelengths in a WDM link.

G(y): number of data segments waiting in a data queue associated with an outgoing WDM link y, $0 \leq y < N$; array G is initialized with zeros.

V(y): identifier of a plane in the parallel-plane switch to be used for the transfer of a next data segment in data queue number y; array V is initialized with arbitrary output-port numbers.

Q: data segment queue at input of a smearing unit sorted according to outgoing link number.

P: switching plane queue sorted according to switching plane number.

$_hq(y)$: head of data segment queue associated with outgoing link y, $0 \leq y < N$.

$q_t(y)$: tail of data segment queue associated with outgoing link y, $0 \leq y < N$.

$_hp(s)$: head of switching plane queue associated with an outgoing WDM link to be accessed, i.e., a pointer to a data segment to be transferred from a respective data segment queue when the incoming link is connected to a switching plane s of the parallel-plane switch.

$p_t(s)$: tail of plane service queue associated with an outgoing WDM link to be accessed when the tail becomes the head of the plane service queue and the incoming link is connected to plane s.

[x]: x modulo W, W is typically 64 (this modulo function requires no action—it occurs automatically when W is a power of 2 since x is increased by only 1 in each respective step).

FIG. 4 schematically illustrates a channel-to-link smearing distributor 26. The W channels of an input link 24 are demultiplexed by the demultiplexer 40 and, after optical-to-electrical conversion, each channel is connected through the channel-to-link smearing unit 44 to the passive W×W rotator 48. The data segments received from the channels of incoming link 24 are sorted according to output link number. The data segments destined to any given output link are smeared (evenly distributed) across the output connections 27 of the passive rotator 48. The distribution process used in each smearing unit 44 is described below with reference to FIG. 5.

At each smearing unit 44, the output link 32 (FIG. 3) to which each incoming data segment received from a source edge module 22 is to be transferred, is determined a priori, in a manner well known in the art. At the input of the channel-to-link smearing unit 44, the incoming data segments are sorted in N logical data segment queues, each corresponding to an output link 32. The N logical data segment queues are addressed using a pointer Q. The head and tail of a data segment queue corresponding to output link y are referenced by $_hq(y)$ and $q_t(y)$, respectively. The operation $\{d \leftarrow _hq(y)\}$ reads the data segment from the head of the data segment queue and moves the head of queue pointer one step towards the tail of the data segment queue. The operation $\{q_t(y) \leftarrow d\}$ advances the tail of the data segment queue corresponding to output link y one step and writes a data segment at the new tail location of the data segment queue. Each channel-to-link smearing unit 44 numbers the switching planes 28 in accordance with a cyclic clock having a period equal to the number of switching planes 28 (64, for example). The cyclic period is W, W being the number of switching planes 28 (also the number of channels in each WDM link). The cyclic time slots seen by an incoming channel are numbered 0 to W-1. Thus, incoming channel 0, of any incoming link, numbers the switching planes A, B, C, and D shown in FIG. 3 as 0, 1, 2, and 3, respectively, while incoming channel 2, of any incoming link, may number planes C, D, A, and B, as 0, 1, 2, and 3, respectively. The numbering scheme is arbitrary and has no affect on the functioning or efficiency of the smearing units 44.

Figure 5:
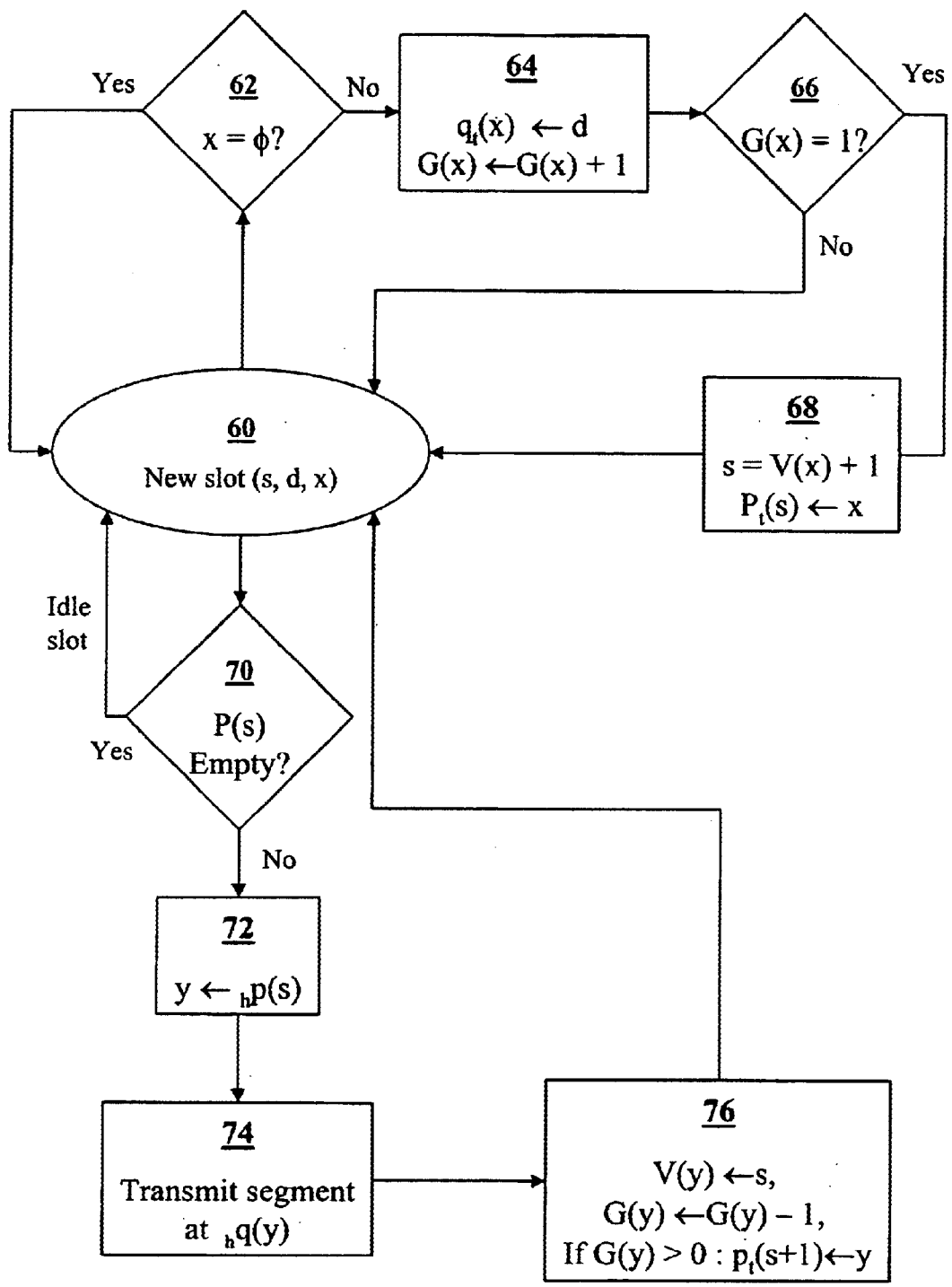
FIG. 5 is a flow chart illustrating a distribution process executed by the channel-to-link smearing unit shown in FIG. 4.

With reference now to FIG. 5, in each new time slot, s, a data segment, d, destined to an output link, x, is eligible to be transferred. This is expressed as (s, d, x) as indicated in the starting step 60 of FIG. 5. An idle time slot in which no data segments are available is identified by setting x=ϕ, ϕ being a null indicator. As shown in FIG. 5 during each time slot s (step 60), a channel is connected through the passive rotator 48 (FIG. 4) to switching plane s, $0 \leq s < W$. The data segment, d, read during the time slot is required to exit from output port x of the respective switching plane s. As described above an incoming channel 24 associates a number s with each switching plane 28 to which the channel is connected during time slot s. Two concurrent processes are executed during each time slot, as graphically illustrated in FIG. 5.

The first process (steps 62–68) places a received data segment d in a data segment queue associated with the output link x. If it is determined in step 62 that x=φ (a null entry), the data segment does not contain useful information and is discarded. The first process then returns to step 60 and awaits the next time slot. If x is not null, in step 64 two operations are performed. In the first ($q_t(x) \leftarrow d$), the data segment d is queued at the tail of the data segment queue x. In a second operation, a record of the number of waiting data segments in the data segment queue x is updated ($G(x) \leftarrow G(x)+1$). If, when the data segment d is received, the respective data segment queue x was empty, as determined in step 66 ($G(x)=1$ after the insertion of the new segment), a reference to the data segment queue x must be appended to an appropriate switching plane queue in step 68 ($p_t(s) \leftarrow x$). Array V stores the last switching plane used to switch a segment from each channel of the WDM link to each of the N output ports. Thus V(x) stores the switching plane number of the last switching plane used to transfer a data segment from data segment queue x. Consequently, if the data segment is stored in a data segment queue that previously contained no data segments, as determined in step 66, the variable s must be updated in step 68 ($s=V(x)+1$). This enables the insertion of an identification of the new data segment in the appropriate switching plane queue P during the operation ($P_t(s) \leftarrow d$).

The second process (steps 70–76), which is performed concurrently with the first process, transfers a queued data segment to switching plane s. If the switching plane queue P(s) contains a data segment that is queued for switching through plane s (P(s) is not empty (step 70)), the designated output port is determined in step 72 ($y \leftarrow {}_hp(s)$), meaning that the data segment at the head of queue y is to be transferred to the switching plane s, and arrays G and V are then updated in step 76 ($G(y) \leftarrow G(y)-1$, and $V(y) \leftarrow s$). In the first operation, $V(y) \leftarrow s$, the switching plane just used to transfer a data segment from the data segment queue s is stored in case that variable is required in step 68 of the first process in a subsequent time slot. In the second operation, $G(y) \leftarrow G(y)-1$, the number of data segments in data segment queue y is decreased by one, because a data segment has just been transferred from the data segment queue. Thereafter, a crucial final procedure in step 76 is the conditional update of switching plane queue P. If data segment queue y is not empty ($G(y)>0$), the identifier y for data segment queue y is inserted at the tail of the next switching plane queue ($p_t(s+1) \leftarrow y$). The switching plane queue P should only contain pointers to data queues that are not empty. Step 76 ensures that empty data queues are not identified in the switching plane queue P.

Figure 6:
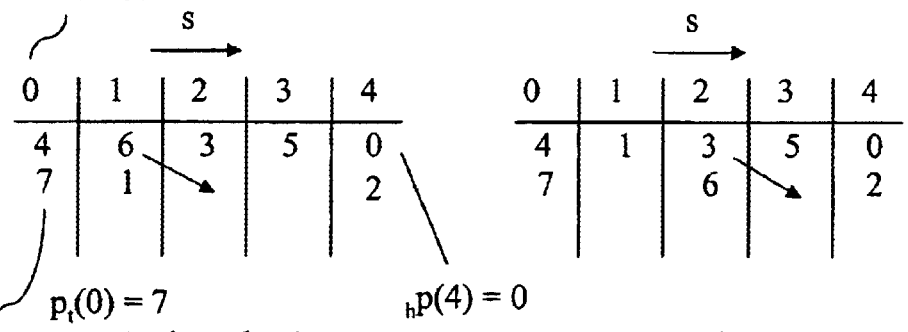
FIG. 6 is a schematic illustration of the effects of the channel-to-link distribution process executed by the channel-to-link smearing unit shown in FIG. 4.

The process of step 76 described above is graphically illustrated in FIG. 6. The two diagrams shown in FIG. 6 schematically illustrate the pointers in the first five switching plane queues (0–4) of a channel-to-link smearing unit 44 in accordance with the invention. For ease of illustration, only eight output links (0–7) are shown in the switching plane queue. The left hand side of FIG. 6 shows the switching plane queue at a given time slot, time slot 1, while the right hand side of FIG. 6 shows the switching plane queue at the following time slot (time slot 2). At time slot 1, a data segment is transferred from data segment queue 6, ${}_hq(6)$. After the transfer, the number of data segments waiting in data segment queue 6 is decreased by 1 (step 76 in FIG. 5) and G(6) is tested to determine whether any data segments remain in the data segment queue. In the example shown, it is determined that data segment queue G(6) contains at least one waiting data segment, so the pointer 6 is moved to the tail of switching plane queue 2 ($p_t(s+1) \leftarrow y$), as shown in step 76 of FIG. 5. As shown at the right hand side of FIG. 5, the pointer to input data queue 3 is at the head of the switching plane queue 2 during time slot 1. Consequently, a data segment is transferred from data segment queue 3 and the pointer to data segment queue 3 is moved to the tail of the queue for the switching plane 3. As will be understood by those skilled in the art, these processes are cyclic and ensure that data segments to be transferred to a given output port of the switching planes 28 are distributed evenly across the switching planes so that contention rarely occurs. If contention does occur, the number of contending segments is bounded. As will be further understood by those skilled in the art, each switching plane 28 preferably includes a short input buffer (not shown) at each input port and each output port. These short buffers enable any contention between data segments transferred to a switching plane at the same time to be resolved without data loss.

A Network Configuration

Figure 7:
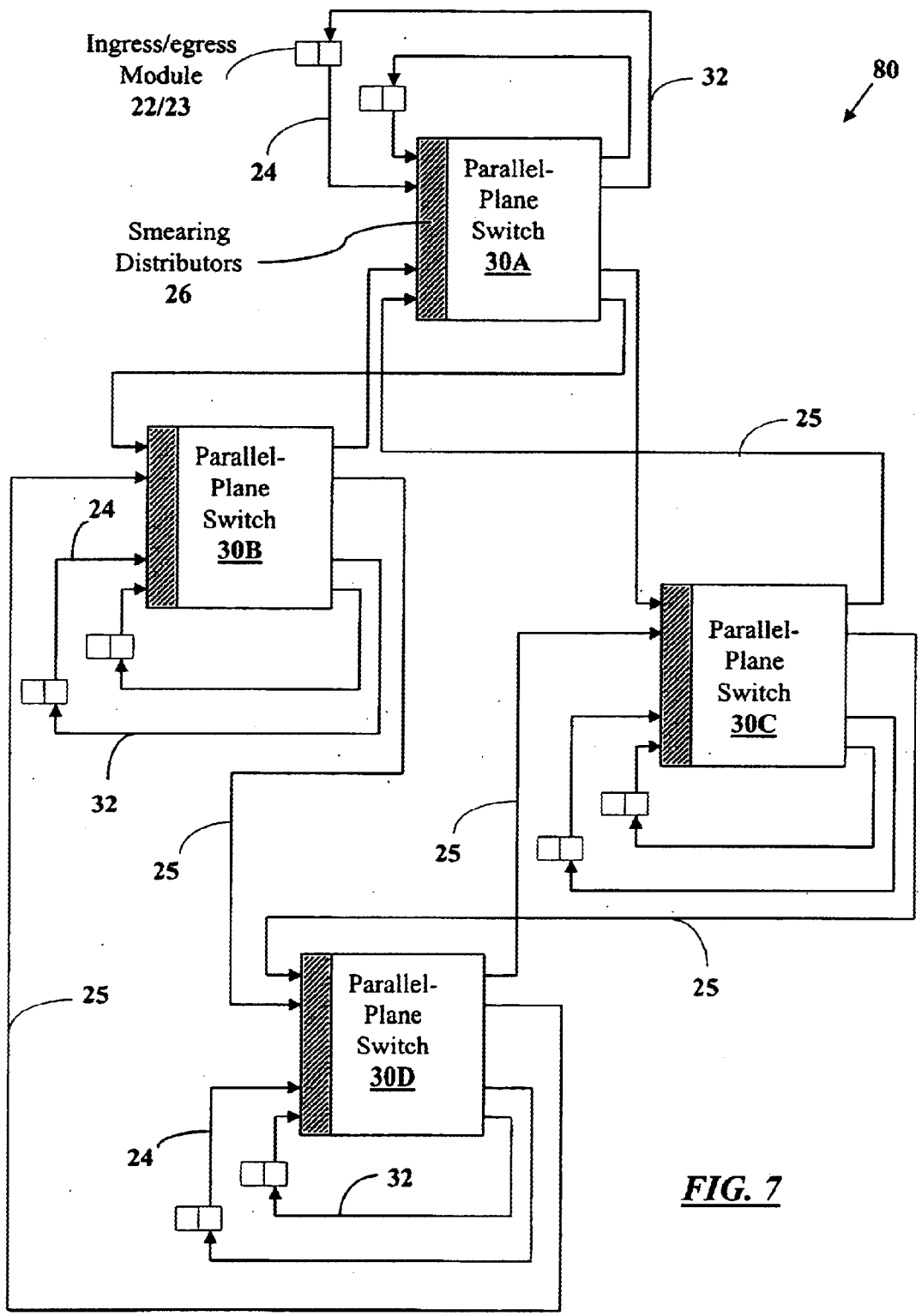
FIG. 7 is a schematic diagram of an exemplary high-speed WDM data network in accordance with the invention.

FIG. 7 is a schematic diagram of a configuration for a high-speed WDM network 80 in accordance with the invention. The high-speed WDM network 80 shown in FIG. 7 includes four distributed core modules 30A–30D. In the WDM network 80, about half the input-output dual ports of each core module 30 are connected to edge modules 22/23 while the other half connect to other core modules 30. A core module 30 with N=512 connects to about 256 other core modules 30. Each core module 30A–D supports many edge modules 22/23, although only two edge modules 22/23 are shown connected to each core module 30 for clarity of illustration. Each edge module 22/23 is connected to an associated core module 30 by at least one WDM optical input link 24 and at least one WDM optical output link 32. Smearing distributors 26, conveniently co-located with the core modules 30A–30D, distribute data segments to the switching planes 28 (see FIG. 3) of the core modules in the manner described above. It should be noted that the smearing distributors 26 distribute all data segments input to a core module 30, whether the data segments originate at a source connected to an edge module 22/23 or are switched from another core module 30.

In the WDM network 80 shown, each core module 30A–D has only two WDM optical links 25 connecting it to neighboring core modules. The traffic from core module 30A to core module 30D, for example, must therefore be carried over two links {30A–30B and 30B–30D} or {30A–30C and 30C–30D}. If the traffic distribution changes so that it is preferable to connect core module 30B directly to core module 30D, a cross connector may be used (not shown). As will be understood by those skilled in the art, FIG. 7 illustrates only one of a large number of potential configurations for a high-speed WDM network in accordance with the invention.

Connection Granularity

Current traffic engineering mechanisms for data networks require explicit reservation and connection setup and cannot scale to networks with a very large number of edge nodes. The high-speed WDM network in accordance with the invention, however, enables the efficient use of each WDM optical link as a single medium while still providing connectivity with fine granularity. The high-speed WDM network also drastically reduces connection-request blocking in a potentially vast data network that may be scaled to millions of edge modules. End users benefit from a high performance communication with propagation delay (milliseconds) being the predominant source of latency. A user can initiate a communications session that requires up to about one Tb/s or as little as a Kb/s. The high-speed WDM network also benefits service providers, who benefit from self-configuration of edge-to-edge paths of arbitrary and adaptive capacity without the need for labor-intensive network management.

As will be understood by those skilled in the art, connection admission control is still required for service-quality control in the high-speed WDM network in accordance with the invention. Any one of a plurality of control algorithms and architectures can be utilized for connection admission control. Those algorithms need only be modified to an extent that connection admission control is based on an upper limit of the entire bandwidth capacity of a WDM link in the network, as opposed to the bandwidth capacity of a WDM channel in the link. There is no imposed lower limit on the bandwidth capacity that a connection may be assigned.

The embodiments of the invention described above are intended to be exemplary only. The scope of the invention is therefore intended to be limited solely by the scope of the appended claims.

What is claimed is:

1. A smearing distributor for a wavelength-division multiplexed (WDM) data network, comprising:
   a) a demultiplexer for demultiplexing signals received from a WDM link in the data network;
   b) a plurality of smearing units each having an input port and an output port, the smearing units receiving the demultiplexed signals at the input port; a plurality of data segment queues associated with each input port; and, a process for selecting a data segment from one of the data segment queues and transferring the data segment to the output port so that data segments transferred from any given data segment queue are transferred to the output port in a predetermined order; and
   c) a passive rotator having a plurality of input ports and a plurality of output ports, each input port being adapted for connection to a respective output port of a smearing unit, and each output port being connected by a communications channel to a respective input port of a plane of a parallel-plane switch, the passive rotator transferring data segments from the smearing units to the parallel-plane space switch in accordance with a predefined cyclic schedule.

2. A method of transferring data through a wavelength-division multiplexed (WDM) link in a WDM network, comprising the steps of:
   a) transferring the data as fixed-length data units from an ingress edge module connected to the WDM link to a smearing distributor located between the ingress edge module and a switching core that includes a plurality of parallel switching planes, the smearing distributor executing a process that ensures that consecutive data units destined to a given egress link connected to the switching core are transferred to adjacent, consecutive planes in the switching core.

3. A method as claimed in claim 2 wherein consecutive data units destined to a given outgoing WDM link in the core module are transferred to adjacent, consecutive planes in the switching core by a smearing distributor connected to the link.

4. A method as claimed in claim 3 wherein the smearing distributor is co-located with the switching core.

5. A method as claimed in claim 2 wherein the data units are data segments of fixed length.

6. A method as claimed in claim 5 wherein the smearing distributor performs the following steps when the data units are received:
   a) determines whether a data unit is a valid data unit;
   b) if the data unit is a valid data unit, adds the data unit to a queue associated with an outgoing link to which the data unit is to be transferred;
   c) computes a total of data units in the queue; and
   d) if the data unit is the only data unit in the queue, places a pointer to the queue at a tail of a transfer queue associated with a next time slot after a time slot in which a data unit to the same egress module was last transferred to that outgoing link.

7. A method as claimed in claim 6 wherein the smearing distributor concurrently performs the following steps:
   a) determining whether a switching plane queue associated with a current time slot is empty;
   b) transferring a waiting data unit using a pointer from the switching plane queue and subtracting one from a number of packets waiting in an associated data segment queue if the switching plane queue is not empty; and
   c) if there is at least one data unit waiting in the data segment queue, moving a pointer to the queue a tail of the switching plane queue for an adjacent time slot.

8. A method as claimed in claim 7 wherein the method further includes a step of setting a pointer to indicate a switching plane used to transfer a data segment from the data segment queue.

* * * * *